Patented Oct. 20, 1942

2,299,164

UNITED STATES PATENT OFFICE 2,299,164

BRAZING LIGHT METALS

Mike A. Miller, New Kensington, Pa., assignor to Aluminum Company of America, Pittsburgh, Pa., a corporation of Pennsylvania No Drawing. Application July 30, 1940, Serial No. 348,545

11 Claims. (Cl. 148—26)

This invention relates to the art of joining a plurality of metallic members, and it is more particularly concerned with brazing light metal parts. The term, "light metal," as it is used hereinafter, is intended to embrace both commercially pure aluminum and magnesium, as well as alloys containing at least 50 per cent by weight of either metal.

Brazing, as generally understood in the art, consists of joining metal parts by fusing a lower melting point metal between them without appreciable fusion of the parent metal. In a brazing operation where a flux is used, the parts to be joined are usually first coated with flux and assembled with a piece of brazing metal between the juxtaposed parts, or at the edge of the areas to be joined. The brazing or filler metal may alternatively be added as a powder wire, strip or sheet, or make take the form of a metal coating upon the parts being joined. Where large quantities of articles are to be brazed, the assembled articles are put into a furnace or other heating medium which causes a fusion of the flux and of the joining or brazing metal. Brazing is to be distinguished from the customary soft soldering operation, which is conducted at much lower temperatures, where the molten solder is supplied to areas to be joined along with a flux, and the fluid substances are often worked over the area being soldered by a suitable tool. The soundness of the soldered joint may thus depend in part upon mechanical agitation of both the flux and solder, whereas in brazing one must rely solely on the behavior of the flux and molten metal apart from external agitation.

A satisfactory brazing flux should, in general, possess the following physical properties. It must flow at a temperature somewhat below the melting point of the brazing metal. It must adhere to or wet the surfaces of the metals being joined. It must facilitate the spreading and alloying of the fused brazing metal over the surfaces of the metallic parts to be joined. It should also remove any oxide coating or other adherent foreign matter present on the metal parts in order to establish a metal-to-metal contact between the brazing metal and the parts being joined, but it should not appreciably attack the metal, and it should also protect the cleansed surface against reoxidation. Finally, any residue of the flux remaining after completion of the joining should be readily removable. This flux residue, if not removed, is likely to cause corrosion of the metal and brazed joint upon continued exposure to a damp atmosphere or other like media with which the brazed article may come into contact.

It has not been possible heretofore to braze articles made from aluminum or magnesium or alloys wherein these metals predominated, chiefly because of the difficulty encountered in removing the adherent and resistant film of oxide found on the surface of these metals. Furthermore, a number of alloys that would be satisfactory as a joining material from the standpoint of resistance to corrosion have too high melting points to be used with soldering fluxes, while on the other hand, in many instances, the melting points of the alloys suitable for brazing are too low for successful use with known welding fluxes. The problem of removing the oxide film is more acute in brazing than in soldering, since in the soldering of light metals both flux and solder are usually agitated by the soldering tool or by vaporization of copious amounts of volatile reaction products. This agitation aids in breaking up and removing the oxide film and permits the solder to come immediately into intimate contact with the light metal where the oxide has been removed. Such a procedure is not possible in the brazing operation because the fusion of the joining metal is usually effected in a furnace or other medium which precludes agitation with a tool. There the brazing flux must act of its own accord to remove completely the oxide coating; when this removal has been effected, the flux causes the molten brazing metal to spread evenly between and over the surfaces to be joined.

Soldering fluxes have been found to be unsuitable for brazing purposes. Many of them are unstable at the higher temperatures used in the brazing operation. That is, they either vaporize, decompose, or run away before the brazing temperature is reached. Other soldering fluxes are of the type known as reaction fluxes and contain relatively large amounts of heavy metal salts, zinc chloride for example. The heavy metal salts decompose with a resultant deposit of heavy metal which either serves as the solder or as an interfacial layer between the solder and metal surfaces being joined, or it may alloy with the solder and alter the properties of the solder. When brazing light metals, such deposition of heavy metal is undesirable because it weakens the joint and renders it more susceptible to corrosion.

It is an object of my invention to provide a method of brazing of light metal members. Moreover, it is an object of my invention to provide a brazing flux which, without external agitation, removes the oxide coating and any adherent foreign matter present on light metal surfaces with a very high degree of efficiency. Another object of my invention is to promote the spread of the molten brazing metal over the metallic parts to be joined by means of a flux which will cause the brazing metal to come into intimate contact with the surface of the metal being joined. Still another object is the provision of a flux that makes it possible to use as filler material corrosion resistant alloys, such as aluminum or magnesium base alloys, at lower temperatures than prevail in the welding operations. A further object is to provide a flux suitable for furnace brazing operations.

Other objects of this invention will become apparent from the following description and appended claims.

I have discovered that light metal articles can be quickly and conveniently brazed by means of a suitable filler metal in the presence of a flux containing relatively small amounts of an alkali metal fluoride and zinc chloride, zinc bromide, and/or zinc fluoride in a carrier or vehicle composed of two or more alkali metal chlorides. The presence of the zinc salts in the flux appears to promote both the spread of the fused brazing metal and its adherence to the light metal surface as well as aiding in the removal of any oxide coating. I have found that this flux also has a very efficient cleansing action on the surface to be brazed, and is especially effective in removing any oxide film and adhering foreign matter, such as grease, without agitation by external means. By means of this flux, it has been found possible to join light metal parts in a few minutes, the resulting joints being strong and sound. In the case of T-shaped joints, the brazing metal forms a well rounded fillet.

A variety of brazing or filler metals may be used in forming brazed joints by the practice of this invention providing they have melting points below that of the metal being brazed, and that they further possess such other requisite properties as adherence to the parent metal by alloying therewith, strength, and resistance to corrosion. Generally the filler metal has the same base as the parent metal, and hence has a higher melting point than soft solders. Thus, the temperature at which the joint is formed generally lies between 950° F., or in any event, the melting point of the filler metal, and the temperature at which the parent metal begins to fuse. However, it is usually desirable to form the joint at a temperature giving suitable fluidity to the filler metal without approaching too closely the fusion temperature of the parent metal since at that temperature that metal is soft and easily deformed. In most instances it has been found that very satisfactory results are obtained by using aluminum base alloys as filler material for joining aluminum or aluminum base alloy members, and magnesium base alloys for brazing magnesium or magnesium base alloy parts. Some binary aluminum base alloys that have given satisfactory results are those containing about 5 to 13 per cent silicon and 87 to 95 per cent aluminum which contains the usual impurities.

The components of this brazing flux may be present in varying proportions. A satisfactory range for the alkali metal fluoride has been found to be about 1 to 15 per cent of the total weight of the flux, but I prefer to use from 2 to 8 per cent of this component. It has been found that at least 1 per cent of this fluoride must be present to obtain the proper cleansing of the metal surface, but more than 15 per cent of the normal fluoride raises the melting point beyond the range that can be used for brazing. Both the normal fluorides and acid fluorides of the alkali metals may be used in the flux, both being included in the term, alkali metal fluorides. If one or more of these normal fluorides are used, the total should not exceed about 15 per cent. In case the acid fluorides are used, the total should not exceed 30 per cent. More than this amount raises the melting point of the flux to too high a temperature for brazing. If normal fluorides and acid fluorides are used in combination, the total should never exceed about 30 per cent, of which total the normal fluoride should not constitute more than 15 per cent.

The three zinc salts, zinc chloride, zinc bromide, and zinc fluoride, may be used either singly or in combination in amounts of 0.01 to 16 per cent of the chloride, 0.01 to 27 per cent of the bromide, and 0.01 to 12 per cent of the fluoride, but the total in no case should exceed an amount which contains more than about 7.7 per cent zinc. If the chloride alone is used, I prefer to employ from 6 to 12 per cent of this salt; if the bromide is used alone, the preferred range is from 8 to 14 per cent; and if the fluoride is used alone, from 2 to 7 per cent is preferred. As the result of my investigations I have found that the maximum amount of zinc, herein referred to as the available zinc, should be less than about 7.7 per cent by weight of the entire flux and that all of the available zinc need not be deposited to produce a satisfactory joint. This zinc content represents the approximate zinc content of 16 per cent zinc chloride, 27 per cent zinc bromide, and 12 per cent zinc fluoride. If larger amounts of these salts are employed, the metal member being brazed is apt to be excessively attacked and the brazed joint will be inferior in strength and appearance.

Zinc chloride, zinc bromide, and/or zinc fluoride appear to aid in penetrating and removing the oxide film from the surface of the metal, and in combination with the alkali metal fluoride they provide a balanced action of preparing the metal surface and promoting the spread of the fused brazing metal. This is especially important where a large number of articles or complex patterns are brazed in a single article are brazed in a furnace and great uniformity of result is demanded. The use of zinc salts to yield such a relatively small amount of zinc is peculiar to the art of brazing light metals, as far as I am aware. Heretofore in the soldering flux art, large amounts of zinc chloride have been employed, but this practice would be fatal to successful brazing because the large amount of zinc resulting from decomposition of the chloride actually interferes with establishing a joint. Although some deposition of zinc will occur in my flux, no matter how small the addition of salt may be, I have discovered that by restricting the amount of zinc salts within the limits recited hereinabove I can secure rapid and efficient removal of the oxide film and satisfactory spread of the fused filler metal. Whatever deposition of zinc there may be is so small as to be almost imperceptible and without substantial effect upon the properties of the joint, such as the strength and resistance to corrosion. The absence of agitation of the flux during the brazing operation serves to further restrict any deposition of zinc.

The physical properties of the flux are in large part determined by the composition of the carrier or vehicle since this component generally constitutes at least 50 per cent by weight of the entire flux. The relative amounts of the constituents of the vehicle should be adjusted to provide the proper melting point for use with the particular metal being employed to form the joint. The flux should melt before the filler metal fuses, and in brazing light metals I have found that the melting point of the flux should not exceed about 1180° F. Generally, fluxes having melting points between 950 and 1100° F. will be satisfactory for brazing most light metal members. The carrier or vehicle serves to bring the active ingredients into contact with the metal to be joined and it further acts to carry away the oxide particles and other material which the flux has loosened from the surface of the metal. For brazing purposes, the alkali metal chlorides provide the most satisfactory carrier because of their stability, non-oxidizing properties, and the wide melting point range of their mixtures. The chlorides of sodium, potassium, and lithium constitute what are herein referred to as the alkali metal chlorides, and any two or all of them should be employed within the following approximate percentage ranges in terms of the weight of the entire flux:

|  | Per cent |
| --- | --- |
| NaCl | 5 to 60 |
| KCl | 5 to 60 |
| LiCl | 5 to 80 |

The total amount of the chlorides plus the other flux ingredients cannot, of course, exceed 100 per cent. This means that if the maximum amount of one ingredient is used, the amounts of the others must be correspondingly decreased.

Through the use of a brazing flux of the composition recited herein and a suitable filler metal, it thus becomes possible to produce a strong brazed joint either between light metal members or between these metals and such other metals as iron and copper, for example. This flux is also well adapted for use with brazing filler metals of varying composition as has been mentioned above, especially those alloys containing aluminum or magnesium as the predominant component. The flux compositions mentioned hereinabove have a melting point range which makes possible the utilization of corrosion resistant alloys as the brazing or filler metal. Heretofore the only fluxes which could be successfully employed with these corrosion resistant alloys were those having melting points so high as to restrict their utility to welding operations. By using the flux disclosed herein, it thus becomes possible to produce strong corrosion resistant joints in the ordinary furnace brazing operation as well as by other brazing methods.

As illustrative of particular embodiments of this invention, two preferred flux compositions are:
(1) 5% NaCl, 48% KCl, 37% LiCl, 7% LiF, 3% ZnF₂
(2) 26% NaCl, 54% KCl, 12% ZnCl₂, 8% LiF The approximate minimum brazing temperatures which may be used with the fluxes of the illustrated compositions are 950° F. and 1090° F., respectively, but by varying the proportion of the components of the carrier or vehicle, other similar fluxes may be prepared having different minimum brazing temperatures as the nature of the brazing alloy and the members being joined may demand.

Two examples may be cited of the manner in which aluminum and magnesium parts have been successfully brazed in the form of T-shaped joints. In one case two strips of commercially pure aluminum sheet were covered with the above mentioned (2) flux in the form of a water paste along the portions that were to be joined. They were then mounted in a jig to hold the pieces in an inverted T-shape position, and a wire of the brazing alloy (5% Si, 95% Al) was placed at the junction of the two strips. The entire assembly was then placed in a furnace and heated to 1125° F. for 10 minutes. Upon withdrawal of the assembly from the furnace and cooling to room temperature, it was found that the operation had resulted in the production of a sound joint. A symmetrical fillet of brazing metal had been formed on both sides of the joint and there was no visible deposition of metallic zinc. The entire flux residue was readily washed away from the newly formed joint.

In a similar manner, two strips of magnesium were brazed by using a flux consisting of 16% NaCl, 16% KCl, 32% LiCl, 12% ZnCl₂, and 8% KHF₂, a suitable magnesium base alloy filler metal, and heating the assembled strips in a furnace at 1100° F. for 10 minutes. A sound, well filleted joint was produced in this manner.

The examples which have been given hereinabove are intended to illustrate my invention and not to restrict it or the appended claims.

Having thus described my invention, I claim:

1. A method of producing a brazed joint between metallic members at least one of which consists of a light metal, comprising effecting the brazing in the presence of an inorganic salt flux containing up to about 7.7 per cent by weight of available zinc and adapted to effect a rapid and efficient removal of oxide film on the surface of said members, in view of said limited zinc content, without substantial effect upon the properties of the brazed joint apart from the effect of the oxide film removed.

2. A method of producing a brazed joint between metallic members at least one of which consists of a light metal, comprising effecting the brazing in the presence of an inorganic salt flux containing an alkali metal fluoride and up to about 7.7 per cent by weight of available zinc and adapted to effect a rapid and efficient removal of oxide film on the surface of said members, in view of said limited zinc content, without substantial effect upon the properties of the brazed joint apart from the effect of the oxide film removal.

3. A method of producing a brazed joint between light metal members comprising effecting the brazing in the presence of an inorganic salt flux containing up to about 7.7 per cent by weight of available zinc and adapted to effect a rapid and efficient removal of oxide film on the surface of said members, in view of said limited zinc content, without substantial effect upon the properties of the brazed joint apart from the effect of the oxide film removal.

4. A method of furnace brazing light metal members comprising effecting the brazing in the presence of an inorganic salt flux containing up to about 7.7 per cent by weight of available zinc and adapted to effect a rapid and efficient removal of oxide film on the surface of said members, in view of said limited zinc content, without substantial effect upon the properties of the brazed joint apart from the effect of the oxide film removal.

5. A method of producing a brazed joint between metallic members at least one of which consists of a light metal, comprising effecting the brazing in the presence of a flux containing from about 1 to 30 per cent of at least one alkali metal fluoride, but not more than 15 per cent of a normal fluoride, at least one of the group of salts consisting of zinc chloride, zinc bromide, and zinc fluoride in amounts of 0.01 to 16 per cent of the chloride, 0.01 to 27 per cent of the bromide, and 0.01 to 12 per cent of the fluoride, the total amount of said zinc salts calculated on the basis of zinc concentration not exceeding a zinc content of about 7.7 per cent, and at least two salts of the group consisting of sodium chloride, potassium chloride and lithium chloride in amounts of about 5 to 60 per cent sodium chloride, 5 to 60 per cent potassium chloride, and 5 to 80 per cent lithium chloride, the total amount of said chlorides not being less than about 50 per cent, said flux being adapted to effect a rapid and efficient removal of oxide film on the surface of said members, in view of said limited zinc content, without substantial effect upon the properties of the brazed joint apart from the effect of the oxide film removal.

6. A method of producing a brazed joint between metallic members at least one of which consists of a light metal, comprising effecting the brazing in the presence of a flux containing at least two alkali metal chlorides of the group of salts consisting of sodium chloride, potassium chloride and lithium chloride in amounts of about 5 to 60 per cent sodium chloride, 5 to 60 per cent potassium chloride and 5 to 80 per cent lithium chloride, from 1 to 30 per cent of an alkali metal fluoride of which amount not more than 15 per cent consists of a normal fluoride, and up to about 7.7 per cent by weight of available zinc, said flux having a melting point not higher than 1180° F. and adapted to effect a rapid and efficient removal of oxide film on the surface of said members, in view of said limited zinc content, without substantial effect upon the properties of the brazed joint apart from the effect of the oxide film removal.

7. A flux for brazing light metals containing from about 1 to 30 per cent of at least one alkali metal fluoride, but not more than 15 per cent of a normal fluoride, at least one of the group of salts consisting of zinc chloride, zinc bromide, and zinc fluoride in amounts of 0.01 to 16 per cent of the chloride, 0.01 to 27 per cent of the bromide, and 0.01 to 12 per cent of the fluoride, the total amount of said zinc salts calculated on the basis of zinc concentration not exceeding a zinc content of about 7.7 per cent, and at least two chlorides of the group consisting of sodium, potassium and lithium chlorides in amounts of 5 to 60 per cent sodium chloride, 5 to 60 per cent potassium chloride, and 5 to 80 per cent lithium chloride, said flux being characterized, in view of the limited zinc content, by its ability to rapidly and efficiently remove the oxide film from the surface of the light metals without substantially affecting the properties of the brazed joint apart from the effect of the oxide film removal.

8. A flux for brazing light metals containing about 1 to 15 per cent of at least one normal fluoride from the group consisting of sodium fluoride, potassium fluoride, and lithium fluoride, at least one of the group of salts consisting of zinc chloride, zinc bromide, and zinc fluoride in amounts of 0.01 to 16 per cent of the chloride, 0.01 to 27 per cent of the bromide, and 0.01 to 12 per cent of the fluoride, the total amount of said zinc salts calculated on the basis of zinc concentration not exceeding a zinc content of about 7.7 per cent, and at least two chlorides of the group consisting of sodium, potassium and lithium chlorides in amount of 5 to 60 per cent sodium chloride, 5 to 60 per cent potassium chloride, and 5 to 80 per cent lithium chloride, said flux being characterized, in view of the limited zinc content, by its ability to rapidly and efficiently remove the oxide film from the surface of the light metals without substantially affecting the properties of the brazed joint apart from the effect of the oxide film removal.

9. A flux for brazing light metals containing about 1 to 30 per cent of at least one acid fluoride from the group consisting of sodium acid fluoride, potassium acid fluoride, and lithium acid fluoride, at least one of the group of salts consisting of zinc chloride, zinc bromide, and zinc fluoride in amounts of 0.01 to 16 per cent of the chloride, 0.01 to 27 per cent of the bromide, and 0.01 to 12 per cent of the fluoride, the total amount of said zinc salts calculated on the basis of zinc concentration not exceeding a zinc content of about 7.7 per cent, and at least two chlorides of the group consisting of sodium, potassium and lithium chlorides in amounts of 5 to 60 per cent sodium chloride, 5 to 60 per cent potassium chloride, and 5 to 80 per cent lithium chloride, said flux being characterized, in view of the limited zinc content, by its ability to rapidly and efficiently remove the oxide film from the surface of the light metals without substantially affecting the properties of the brazed joint apart from the effect of the oxide film removal.

10. A flux for brazing light metals containing about 1 to 15 per cent of at least one alkali metal fluoride, at least one of the group of salts consisting of zinc chloride, zinc bromide, and zinc fluoride in the proportion of about 6 to 12 per cent zinc chloride, 8 to 14 per cent zinc bromide, and about 2 to 7 per cent zinc fluoride, the total amount of said zinc salts calculated on the basis of zinc concentration not exceeding a zinc content of about 7.7 per cent, and at least two chlorides of the group consisting of sodium, potassium and lithium chlorides in amounts of 5 to 60 per cent sodium chloride, 5 to 60 per cent potassium chloride, and 5 to 80 per cent lithium chloride, the total amount of said chlorides exceeding about 50 per cent of the entire weight of the flux, said flux being characterized, in view of the limited zinc content, by its ability to rapidly and efficiently remove the oxide film from the surface of the light metals without substantially affecting the properties of the brazed joint apart from the effect of the oxide film removal.

11. A flux for brazing light metals composed of 1 to 30 per cent of at least one alkali metal fluoride, but not more than 15 per cent of a normal fluoride, at least one of the group of salts consisting of zinc chloride, zinc bromide, and zinc fluoride in amounts of 0.01 to 16 per cent of the chloride, 0.01 to 27 per cent of the bromide, and 0.01 to 12 per cent of the fluoride, the total amount of said zinc salts calculated on the basis of zinc concentration not exceeding a zinc content of about 7.7 per cent, and at least two chlorides of the group consisting of sodium, potassium and lithium chlorides in amounts of 5 to 60 per cent sodium chloride, 5 to 60 per cent potassium chloride, and 5 to 80 per cent lithium chloride, said flux having a melting point below about 1180° F.

MIKE A. MILLER.